(12) United States Patent
Saitou et al.

(10) Patent No.: US 7,951,042 B2
(45) Date of Patent: May 31, 2011

(54) CONTROL DEVICE FOR AUTOMATIC TRANSMISSION

(75) Inventors: Yoshiharu Saitou, Wako (JP); Masaaki Takamatsu, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 542 days.

(21) Appl. No.: 12/019,333

(22) Filed: Jan. 24, 2008

(65) Prior Publication Data

US 2008/0182721 A1  Jul. 31, 2008

(30) Foreign Application Priority Data

Jan. 25, 2007  (JP) .................. 2007-015522

(51) Int. Cl.
*F16H 61/58* (2006.01)
*B60W 10/02* (2006.01)

(52) U.S. Cl. ............ 477/64; 477/77; 477/176; 477/901

(58) Field of Classification Search .............. 477/62, 477/64, 65, 77, 97, 174, 175, 176, 180, 901; 701/55, 56; 192/3.63

See application file for complete search history.

(56) References Cited

U.S. PATENT DOCUMENTS

| | | | |
|---|---|---|---|
| 5,535,863 A | 7/1996 | Vukovich et al. | |
| 5,733,223 A | 3/1998 | Matsubara et al. | |
| 5,743,829 A * | 4/1998 | Tanizawa et al. | 477/174 |
| 5,807,204 A * | 9/1998 | Shiiba et al. | 477/176 |
| 6,050,919 A | 4/2000 | Kusafuka et al. | |
| 6,139,466 A * | 10/2000 | Nishino | 477/65 |
| 6,236,929 B1 * | 5/2001 | Sen et al. | 701/93 |
| 6,516,261 B2 * | 2/2003 | Ohashi et al. | 701/51 |
| 7,530,924 B2 * | 5/2009 | Brevick | 477/176 |

FOREIGN PATENT DOCUMENTS

| | | | | |
|---|---|---|---|---|
| DE | 196 32 118 A1 | 2/1997 | | |
| DE | 196 34 166 A1 | 2/1997 | | |
| EP | 0 445 770 A1 | 9/1991 | | |
| EP | 1 217 264 A2 | 6/2002 | | |
| EP | 1 296 085 A2 | 3/2003 | | |
| EP | 1 452 781 A2 | 9/2004 | | |
| JP | 63318361 | 12/1988 | | |
| JP | 05302671 A * | 11/1993 | | 477/174 |
| JP | 6017911 | 1/1994 | | |
| JP | 06221425 A * | 8/1994 | | 477/62 |
| JP | 10325460 | 12/1998 | | |
| JP | 2004138147 | 5/2004 | | |
| JP | 2005-098341 A | 4/2005 | | |
| JP | 2005-113993 A | 4/2005 | | |

* cited by examiner

*Primary Examiner* — Roger Pang
(74) *Attorney, Agent, or Firm* — Arent Fox LLP

(57) ABSTRACT

A control device for an automatic transmission having a torque converter with a lock-up clutch provided between an engine and the automatic transmission, and a lock-up control device for controlling an engaged condition of the lock-up clutch. The control device includes a plurality of different target slip ratio maps each having a plurality of target slip ratio characteristic lines of the lock-up clutch predetermined according to a throttle angle, a first map selector for selecting one of the target slip ratio maps according to a running range, according to whether the running road is a level road/downhill road or an uphill road, and according to a gear position during running in the condition where an accelerator pedal is depressed, and a second map selector for selecting one of the target slip ratio maps according to a running range, according to whether the running road is a level road/uphill road or a downhill road, and according to a gear position during running in the condition where the accelerator pedal is undepressed.

3 Claims, 11 Drawing Sheets

CONTROL DEVICE FOR AUTOMATIC TRANSMISSION

BACKGROUND OF THE INVENTION

1. Field of the Invention

The present invention relates generally to a control device for an automatic transmission, and more particularly to a control device for an automatic transmission for changing a target slip ratio of a lock-up clutch according to a running condition.

2. Description of the Related Art

In a general automatic transmission for a vehicle, a hydraulic lock-up clutch capable of mechanically directly connecting an output shaft of an engine and an input shaft of the automatic transmission is provided in a torque converter, wherein the lock-up clutch is engaged under given conditions to thereby improve the efficiency of the torque converter. Further, the lock-up clutch is engaged at deceleration to thereby transmit a back drive force from drive wheels to the engine, so that a sudden decrease in engine speed can be suppressed. Accordingly, fuel cut to be performed until reaching a predetermined fuel supply restoring engine speed at deceleration can be continued for a long time to thereby improve the fuel economy.

Usually, the lock-up clutch in the automatic transmission is engaged at a predetermined gear position for the purposes of the improvement in fuel economy, etc. To absorb the shock due to complete engagement of the lock-up clutch, a control method for the lock-up clutch for controlling the slip amount of the lock-up clutch according to an operational condition is generally adopted. For example, a target slip ratio of the lock-up clutch according to an operational condition and a gear position is preliminarily stored in a memory, and the engagement capacity of the lock-up clutch is controlled so that an actual slip ratio of the lock-up clutch becomes the target slip ratio.

In a control device for such an automatic transmission in the prior art, the target slip ratio of the lock-up clutch is changed according to a gear position and according to whether an air conditioner is on or off during running both in the condition where an accelerator pedal is depressed and in the condition where the accelerator pedal is undepressed. However, the target slip ratio is not changed on an uphill road and a level road. When the running road is determined to be an uphill road, a lock-up clutch region where the lock-up clutch is engaged is limited to a high vehicle speed region, hereby substantially disengaging the lock-up clutch. Further, in an automatic transmission having a D range and a manual mode range as a running range, the target slip ratio of the lock-up clutch is not changed irrespective of whether the running range is a D range or a manual mode range, but only the lock-up clutch region is changed.

During running on an uphill road, a running resistance increases and acceleration therefore becomes harder than that on a level road. Accordingly, in the case of running on an uphill road with a target slip ratio for a level road, steady heat generation from the lock-up clutch becomes excessive, causing a possibility of reduction in durability. To cope with this problem, the lock-up clutch is disengaged at acceleration on an uphill road. As a result, the fuel economy on an uphill road is deteriorated, and the drivability is also deteriorated.

SUMMARY OF THE INVENTION

It is therefore an object of the present invention to provide a control device for an automatic transmission which can improve both the drivability and the fuel economy irrespective of a running environment with the durability of the lock-up clutch maintained.

In accordance with an aspect of the present invention, there is provided a control device for an automatic transmission having a torque converter with a lock-up clutch provided between an engine and said automatic transmission, and a lock-up control device for controlling an engaged condition of said lock-up clutch, said control device including a plurality of different target slip ratio maps each having a plurality of target slip ratio characteristic lines of said lock-up clutch predetermined according to a throttle angle; first map selecting means for selecting one of said target slip ratio maps according to a running range, according to whether the running road is a level road/downhill road or an uphill road, and according to a gear position during running in the condition where an accelerator pedal is depressed; and second map selecting means for selecting one of said target slip ratio maps according to a running range, according to whether the running road is a level road/uphill road or a downhill road, and according to a gear position during running in the condition where said accelerator pedal is undepressed.

With this configuration, a suitable target slip ratio map is selected by the first map selecting means during running in the condition where the accelerator pedal is depressed, so that both the drivability and the fuel economy can be improved irrespective of a running environment with the durability of the lock-up clutch maintained. Further, a suitable target slip ratio map is selected by the second map selecting means during running in the condition where the accelerator pedal is undepressed, so that a feeling of smooth deceleration on a level road and a feeling of suitable deceleration can be both attained.

Preferably, said running range comprises a D range for performing a shift operation by determining a gear position or gear ratio to be set according to a running condition, and a manual mode range for performing a shift operation instructed by a manual operation of a driver. Accordingly, by changing the target slip ratio according to whether the running range is a D range or a manual mode range, optimum drivability can be ensured in each of the different running ranges.

Preferably, the target slip ratio at a low gear position is set larger than that at a high gear position during running on a level road or an uphill road. By setting the target slip ratio at a low gear position to a value greater than the target slip ratio at a high gear position, the lock-up clutch can be slipped more at the low gear position to thereby increase an engine speed, so that the durability at the low gear position can be further improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
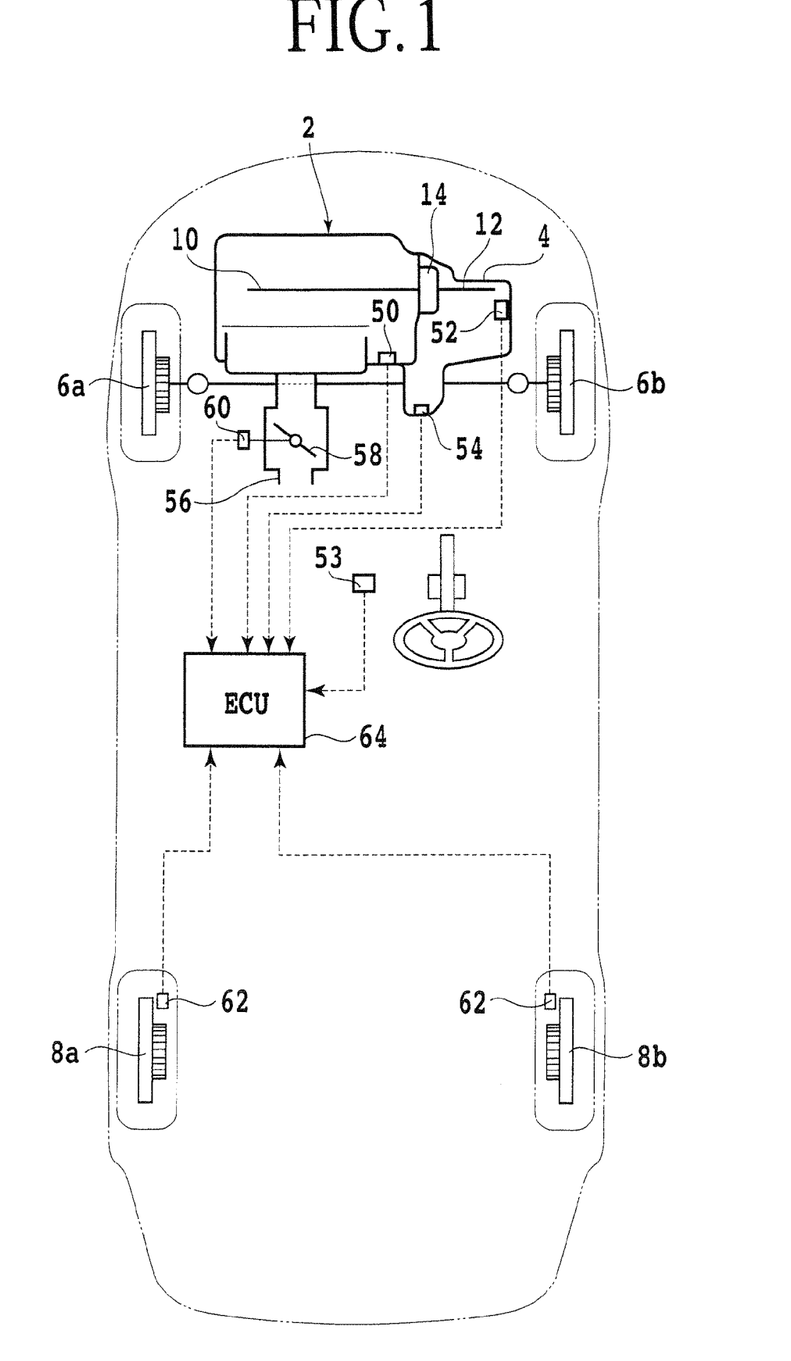
FIG. 1 is a schematic plan view showing a general configuration of a vehicle including a control device for changing a target slip ratio of a lock-up clutch according to a running condition according to the present invention.
Figure 3:
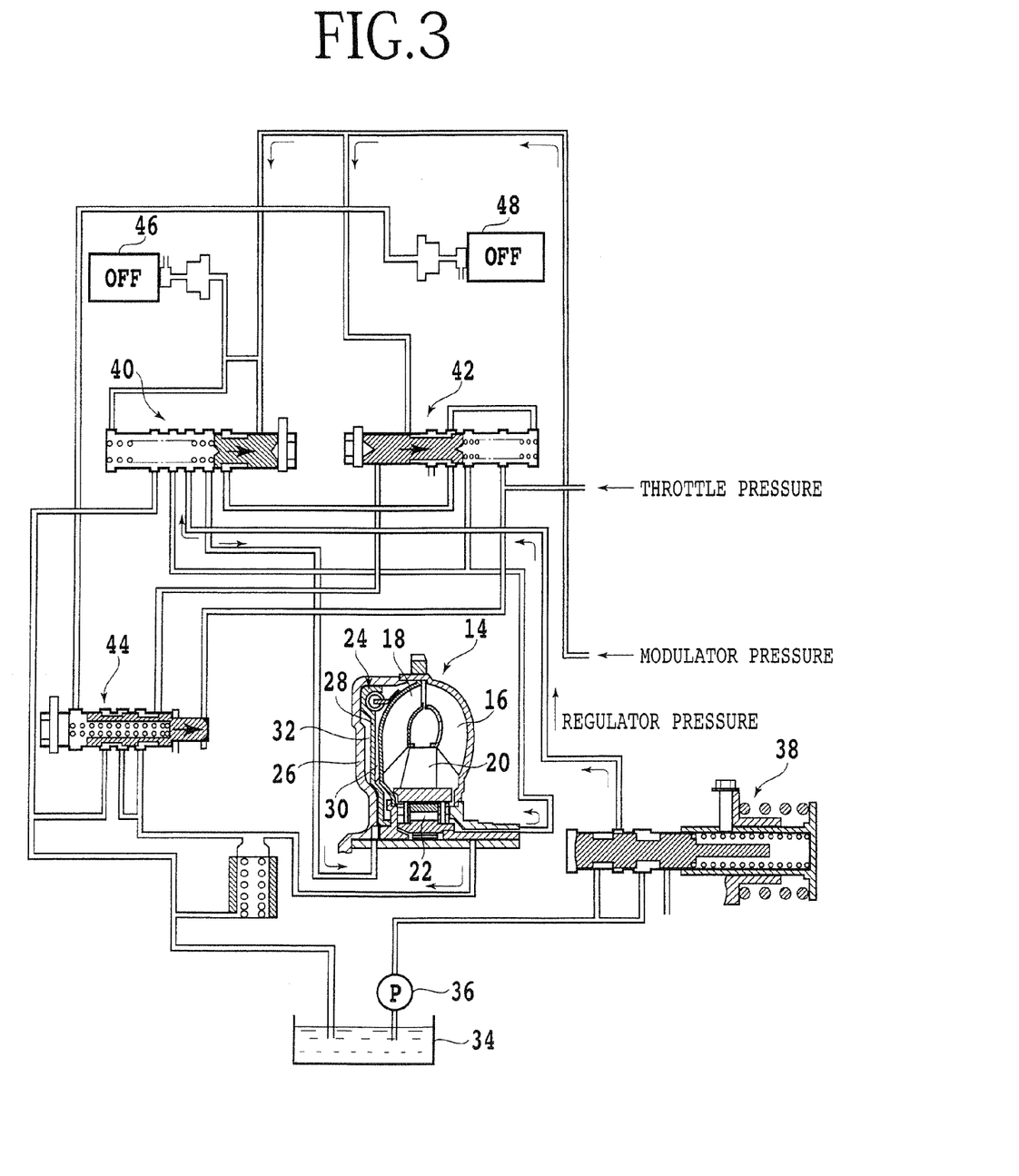
FIG. 3 is a hydraulic circuit diagram of a torque converter in disengaging the lock-up clutch.
Figure 4:
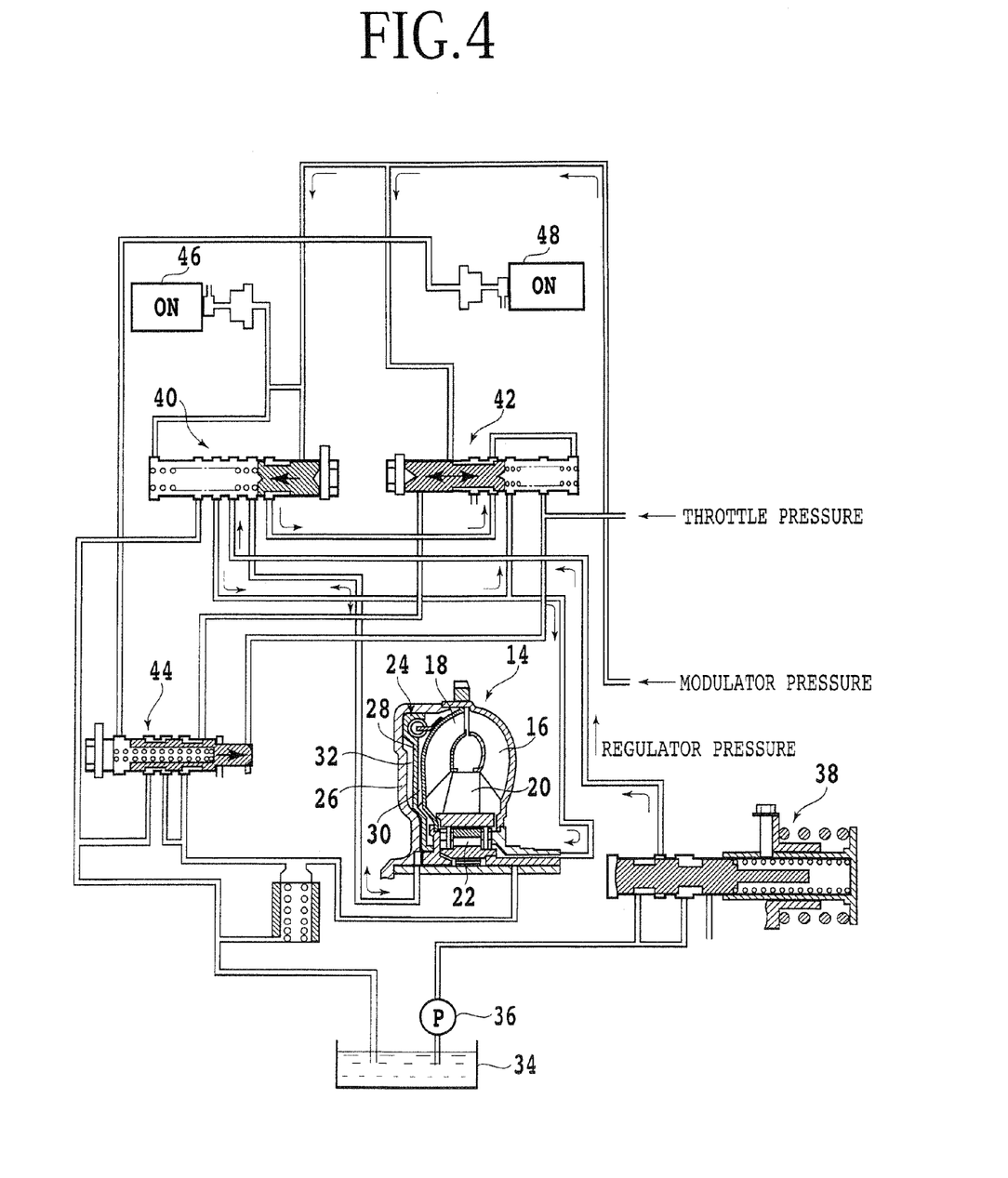
FIG. 4 is a hydraulic circuit diagram of the torque converter in engaging the lock-up clutch.

FIG. 1 is a schematic plan view showing a general configuration of a vehicle including the control device according to the present invention. This vehicle is a front-wheel drive vehicle, which includes a pair of left and right drive wheels 6a and 6b to which the torque of an engine 2 is transmitted through an automatic transmission 4 and a pair of left and right driven wheels 8a and 8b rotating with running of the vehicle. A known torque converter 14 is interposed between a crankshaft 10 of the engine 2 and a main shaft 12 of the automatic transmission 4. Referring to FIG. 3, there is shown a hydraulic circuit diagram of the torque converter 14 in disengaging a lock-up clutch. FIG. 4 is a hydraulic circuit diagram of the torque converter 14 in engaging the lock-up clutch.

As shown in FIG. 3, the torque converter 14 includes a pump impeller 16 connected to the crankshaft 10, a turbine runner 18 connected to the main shaft 12, a stator 20 supported through a one-way clutch 22 to a fixed portion, and a lock-up clutch 24 adapted to connect the pump impeller 16 and the turbine runner 18. The lock-up clutch 24 includes a clutch piston 28 adapted to abut against the inner surface of a torque converter cover 26. A first oil chamber 30 and a second oil chamber 32 are formed on both sides of the clutch piston 28.

When pressurized oil is supplied to the first oil chamber 30 to bring the clutch piston 28 into abutment against the torque converter cover 26, the lock-up clutch 24 is engaged to thereby transmit the torque of the crankshaft 10 directly to the main shaft 12. Conversely, when pressurized oil is supplied to the second oil chamber 32 to bring the clutch piston 28 into separation from the torque converter cover 26, the lock-up clutch 24 is disengaged to thereby break the mechanical connection between the crankshaft 10 and the main shaft 12.

The hydraulic circuit of the torque converter 14 includes an oil pump 36 for pumping up a hydraulic fluid from an oil tank 34 and a regulator valve 38 for regulating the pressure of the hydraulic fluid from the oil pump 36 to a predetermined regulator pressure. A lock-up shift valve 40 functions to transmit the regulator pressure to the second oil chamber 32 of the torque converter 14 and to connect the first oil chamber 30 to the oil tank 34 when the lock-up clutch 24 is disengaged, whereas functions to transmit the regulator pressure to the first oil chamber 30 of the torque converter 14 and to connect the second oil chamber 32 to a lock-up control valve 42 which will be hereinafter described when the lock-up clutch 24 is engaged.

The lock-up control valve 42 functions to relieve the pressure of the hydraulic fluid supplied from the second oil chamber 32 through the lock-up shift valve 40 and to thereby regulate the pressure in the second oil chamber 32, thereby controlling an engagement force of the lock-up clutch 24. A lock-up timing valve 44 is operated by a throttle pressure at a high vehicle speed to thereby operate the lock-up control valve 42, thereby making the second oil chamber 32 open to the atmosphere to fully engage the lock-up clutch 24.

A first solenoid valve 46 is an on/off controlled valve. When the first solenoid valve 46 is turned off, a modulator pressure is transmitted to the left end of the lock-up shift valve 40 to rightward move the spool of the lock-up shift valve 40, so that the regulator pressure is transmitted to the second oil chamber 32 of the torque converter 14, and the first oil chamber 30 is connected to the oil tank 34, thereby disengaging the lock-up clutch 24. When the first solenoid valve 46 is turned on, the modulator pressure is relieved to leftward move the spool of the lock-up shift valve 40, so that the regulator pressure is transmitted to the first oil chamber 30 of the torque converter 14, and the second oil chamber 32 is connected to the lock-up control valve 42, thereby engaging the lock-up clutch 24.

A second solenoid valve 48 is a linear solenoid valve. When the second solenoid valve 48 is turned off, the modulator pressure is transmitted to the lock-up control valve 42 and the lock-up timing valve 44 to rightward bias the spool of the lock-up control valve 42 and the spool of the lock-up timing valve 44. When the second solenoid valve 48 is turned on, the modulator pressure is relieved to cancel the above-mentioned biasing force. The degree of opening of the lock-up control valve 42 can be steplessly controlled by changing the value of a current supplied to the second solenoid valve 48. When the degree of opening of the lock-up control valve 42 is increased, the back pressure in the second oil chamber 32 of the torque converter 14 is decreased to thereby increase the engagement force of the lock-up clutch 24. Conversely, when the degree of opening of the lock-up control valve 42 is decreased, the back pressure in the second oil chamber 32 of the torque converter 14 is increased to thereby decrease the engagement force of the lock-up clutch 24.

Referring again to FIG. 1, the engine 2 is provided with engine speed detecting means 50 for detecting an engine speed Ne, and the automatic transmission 4 is provided with main shaft speed detecting means 52 for detecting a main shaft speed Nm and shift position detecting means 54 for detecting a shift position P. A throttle valve 58 is provided in an intake passage 56. The throttle valve 58 is provided with throttle angle detecting means 60 for detecting a throttle angle $\theta_{TH}$. Further, each of the rear wheels 8a and 8b as the driven wheels is provided with vehicle speed detecting means 62 for detecting a vehicle speed V. Reference numeral 53 denotes slope detecting means for detecting the slope of a road surface on which the vehicle is running. In this preferred embodiment, a G sensor for computing the slope from a longitudinal acceleration G of the vehicle is used as the slope detecting means 53. As a modification, the slope detecting means 53 may be provided by means for directly detecting the angle of inclination of a vehicle body with respect to a horizontal plane.

Figure 2:
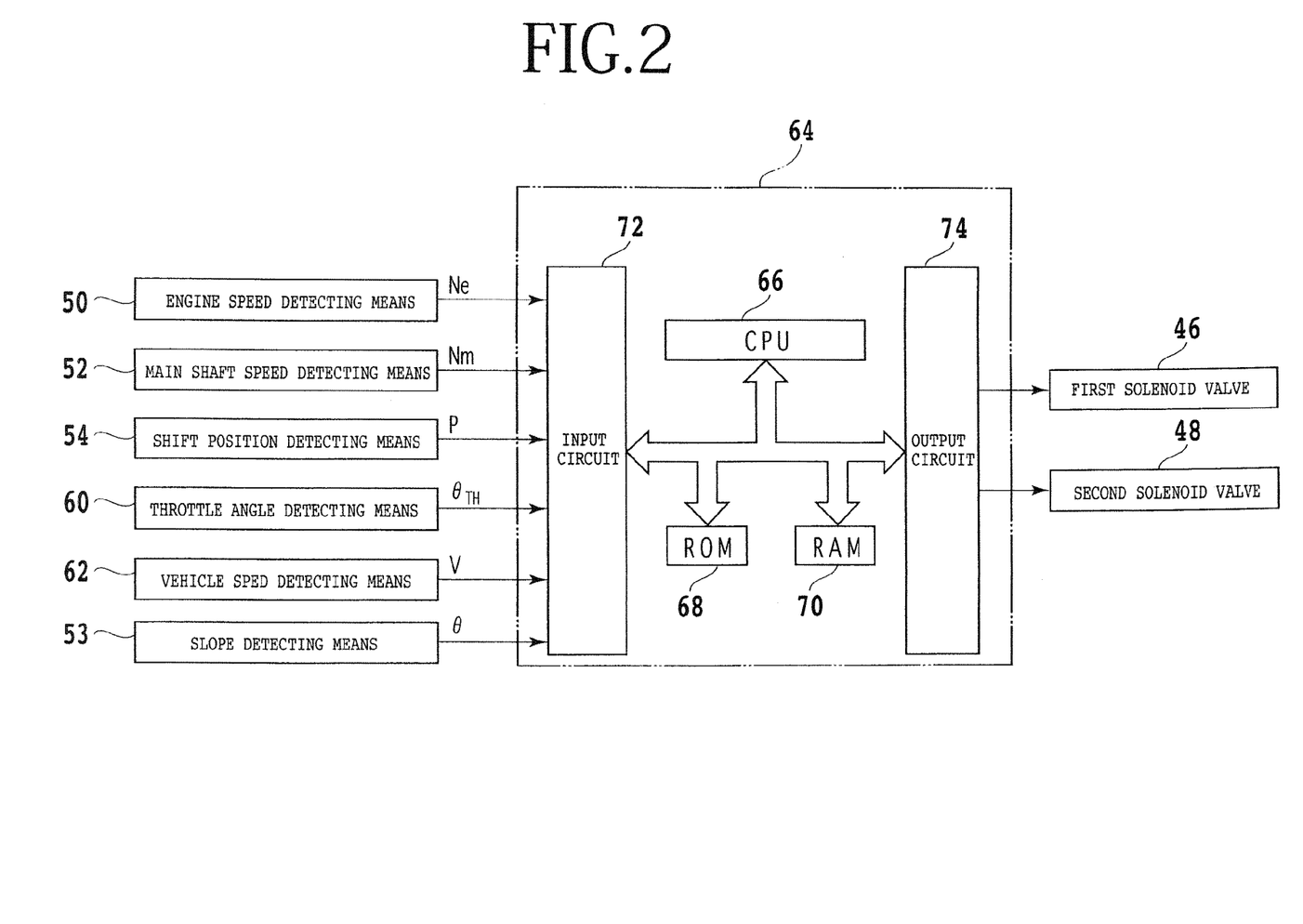
FIG. 2 is a block diagram of an electronic control unit.

FIG. 2 shows an electronic control unit (ECU) 64 for performing computations on output signals from the various detecting means mentioned above according to a control program and driving the first and second solenoid valves 46 and 48 to control the speed ratio of the torque converter 14. The electronic control unit 64 includes a central processing unit (CPU) 66 for performing the computations, a read only memory (ROM) 68 preliminarily storing the control program and data such as various tables, and a random access memory (RAM) 70 for temporarily storing the output signals from the various detecting means and the results of the computations.

The electronic control unit 64 further includes an input circuit 72 to which the engine speed detecting means 50, the main shaft speed detecting means 52, the slope detecting means 53, the shift position detecting means 54, the throttle angle detecting means 60, and the vehicle speed detecting means 62 are connected, and an output circuit 74 to which the first solenoid valve 46 and the second solenoid valve 48 are connected. Thus, the CPU 66 in the electronic control unit 64 performs computations on the various signals input through the input circuit 72 and on the data stored in the ROM 68 according to the control program to be hereinafter described, and controls the values of currents supplied through the output circuit 74 to the first and second solenoid valves 46 and 48. Accordingly, the engagement force of the lock-up clutch 24 can be changed to control the speed ratio of the torque converter 14.

Figure 5:
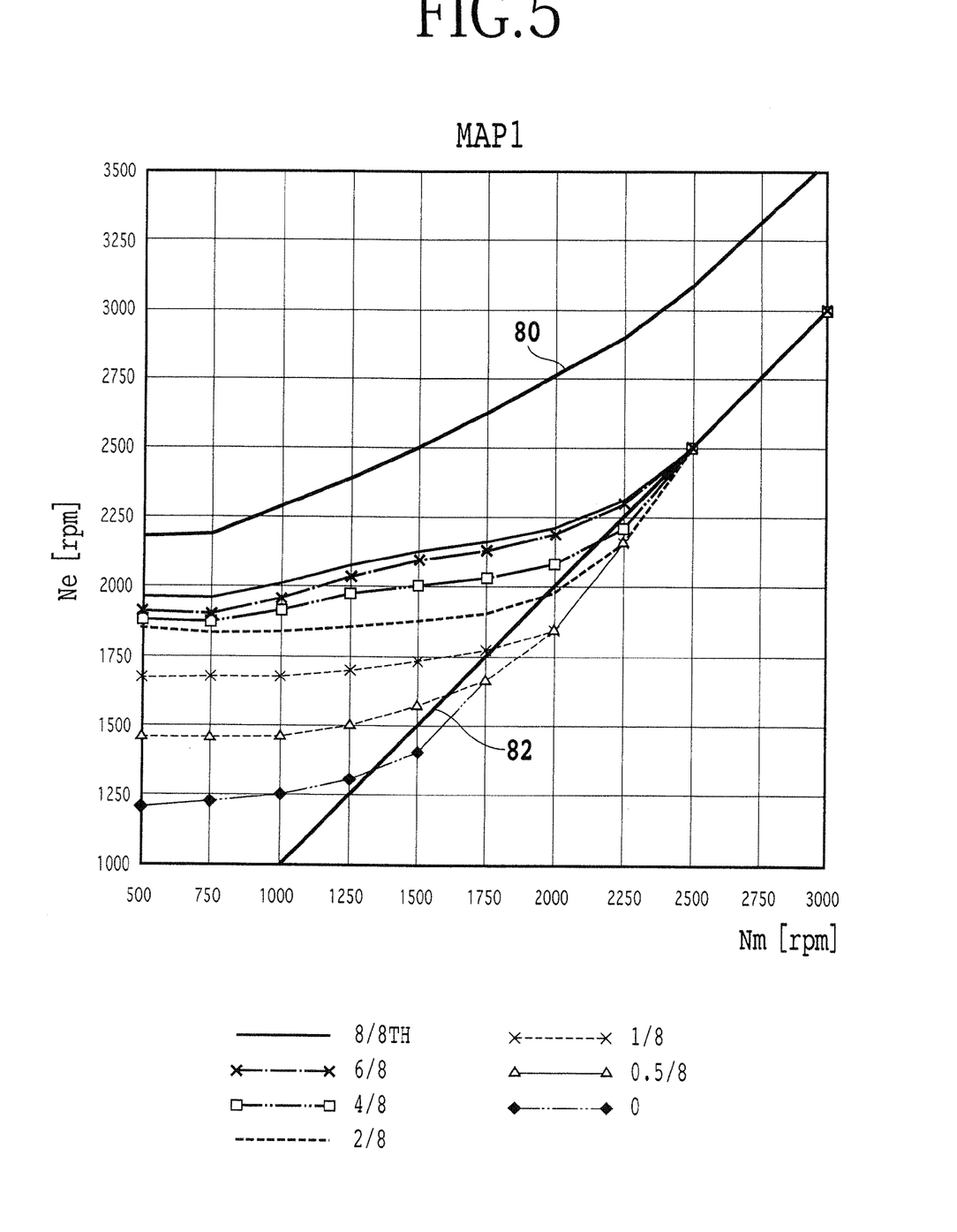
FIG. 5 is a map 1 (base map) having a plurality of target slip ratio characteristic lines of the lock-up clutch.

Referring to FIG. 5, there is shown a map 1 as a base map of a target slip ratio of a lock-up clutch according to a preferred embodiment of the present invention. In the map 1 shown in FIG. 5, the curved line 80 shows the relation between the engine speed Ne and the main shaft speed (input shaft speed) Nm at full-throttle acceleration in the condition where the lock-up clutch is off (disengaged), and the straight line 82 shows the relation between the engine speed Ne and the main shaft speed Nm in the condition where the lock-up clutch is engaged, wherein Ne=Nm. Further, the map 1 shown in FIG. 5 has a plurality of (e.g., seven in this preferred embodiment) target slip ratio characteristic lines preliminarily set according to a throttle angle. In this preferred embodiment, these target slip ratio characteristic lines are set with the throttle angle TH changed to 8/8, 6/8, 4/8, 2/8, 1/8, 0.5/8, and 0.

Figure 6:
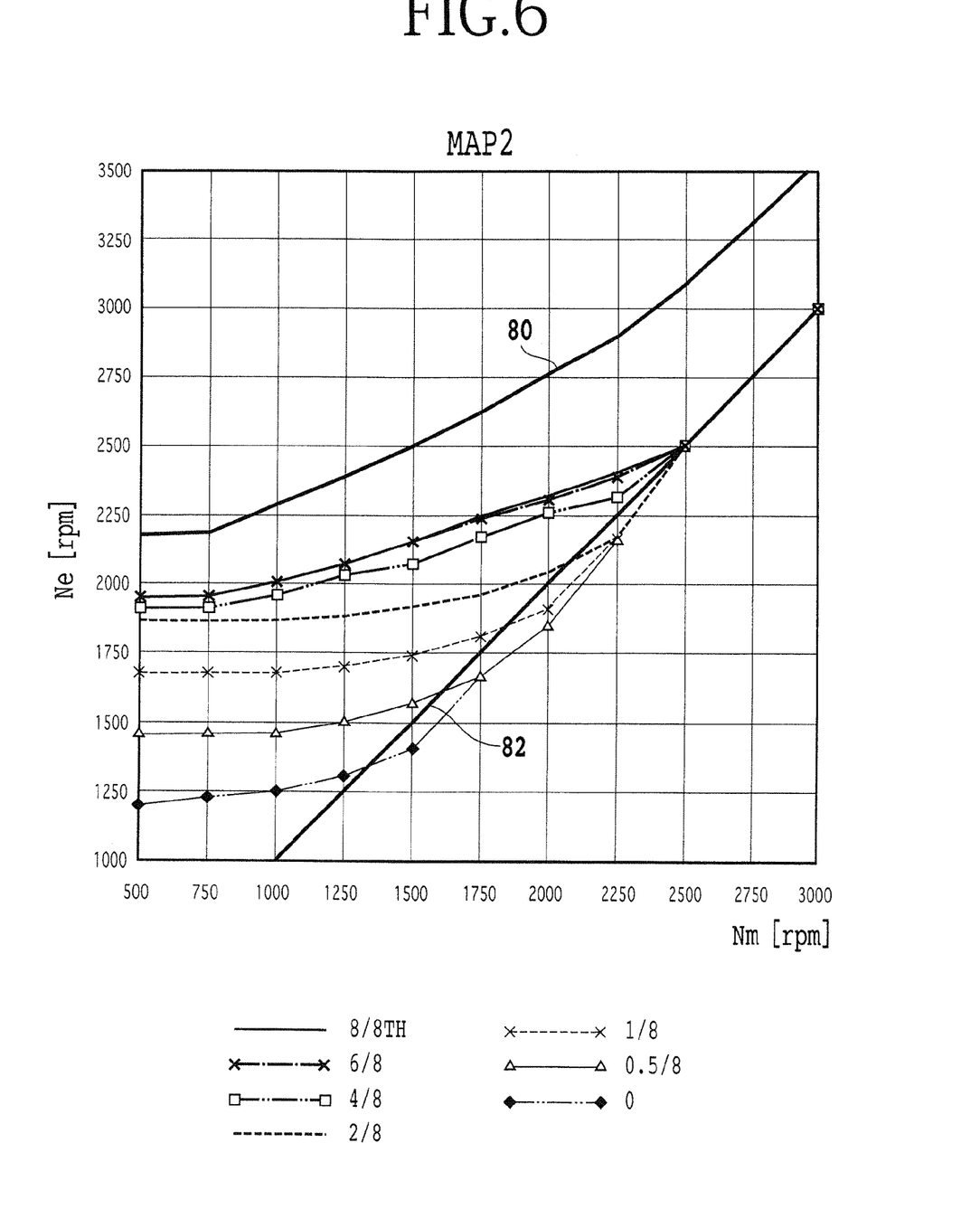
FIG. 6 is a map 2, which is of a higher revolution type as compared with the map 1.
Figure 7:
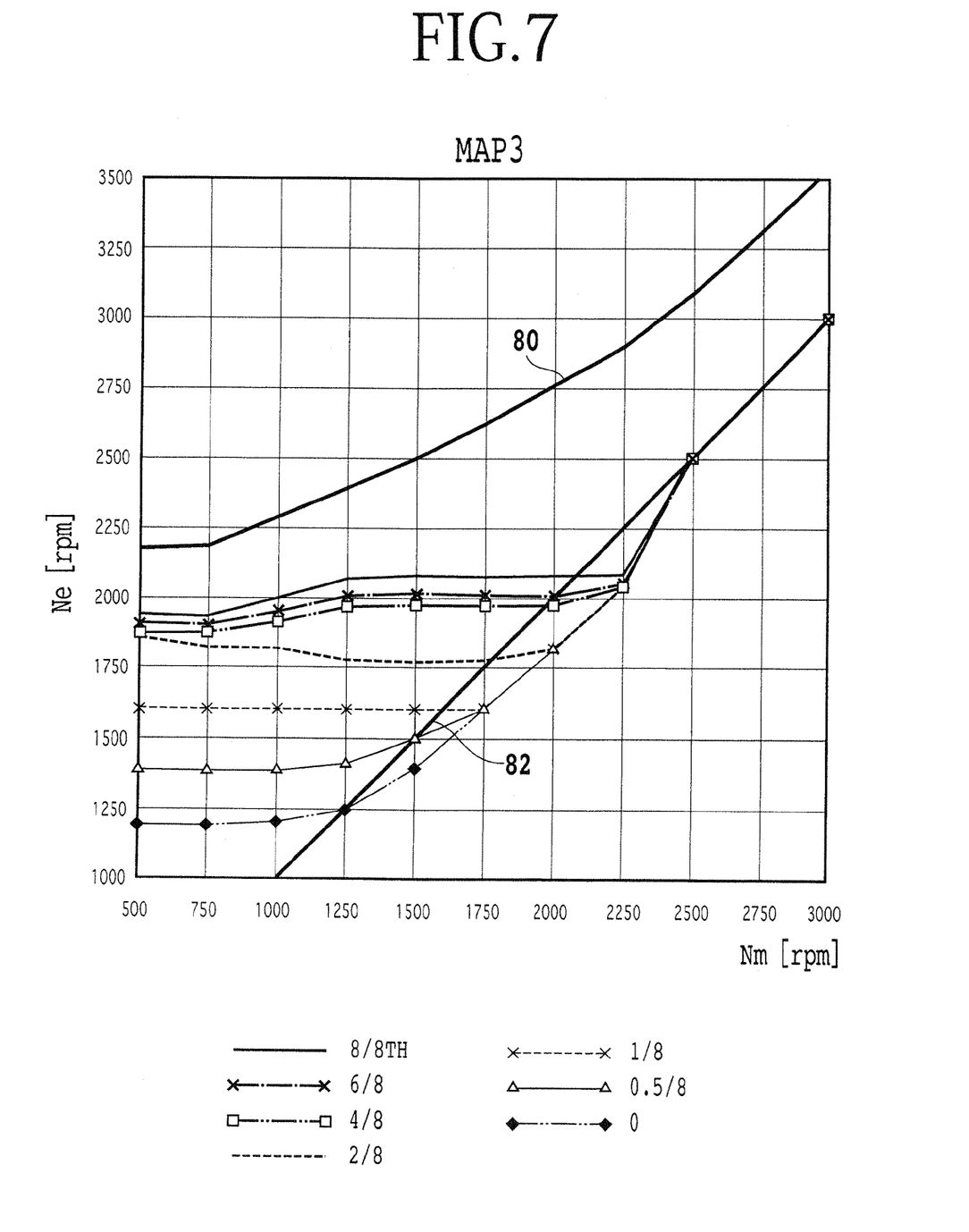
FIG. 7 is a map 3, which is of a lower revolution type as compared with the map 1.
Figure 8:
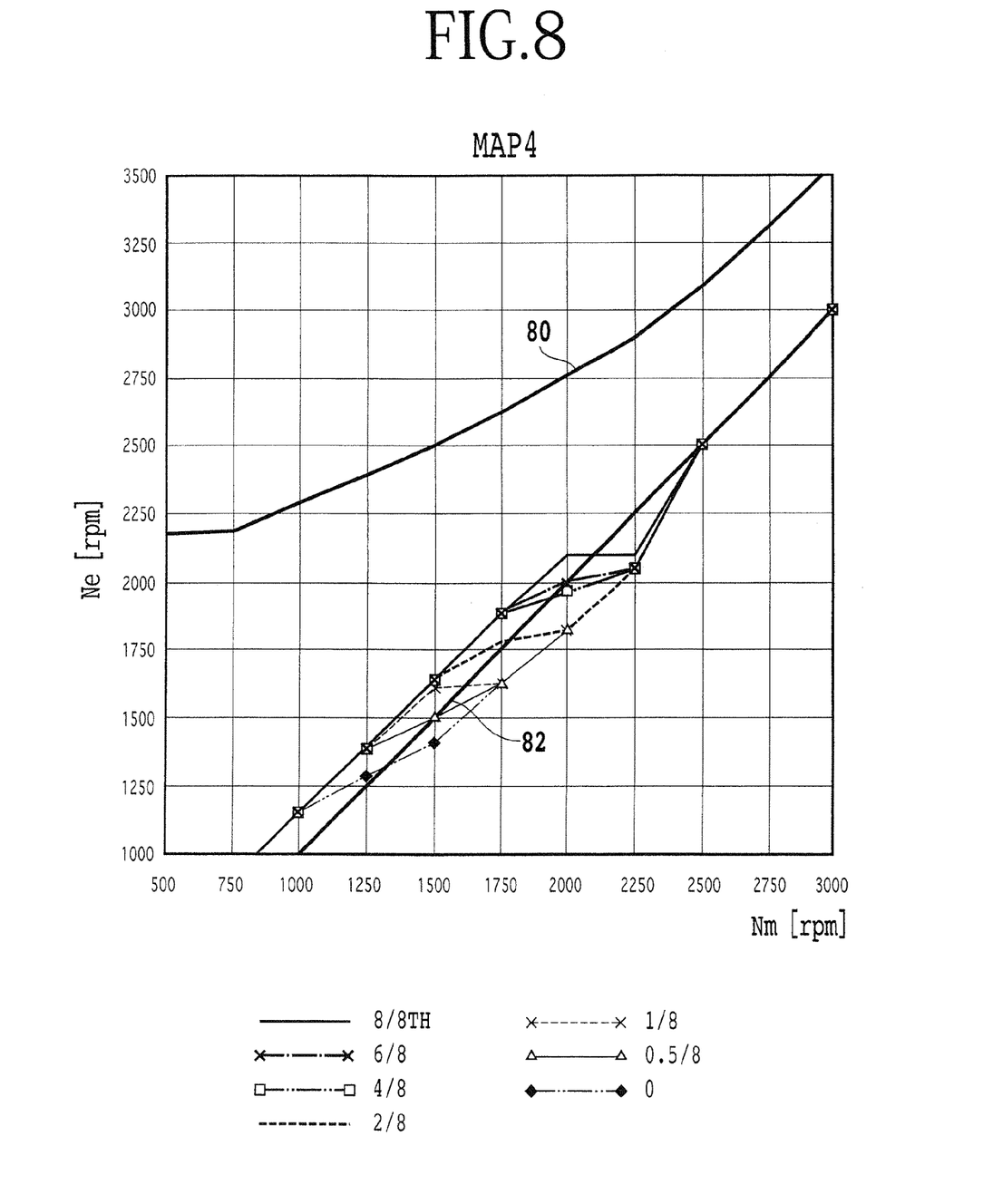
FIG. 8 is a map 4, which is of the same type as that of the map 3 and is dedicated to a high revolutional range, in which the revolution type is lower than that of the map 3.

FIG. 6 shows a map 2, which is of a higher revolution type as compared with the map 1 shown in FIG. 5. The map 2 shown in FIG. 6 has target slip ratio characteristic lines such that the engine speed is early increased with an increase in throttle angle. FIG. 7 shows a map 3, which is of a lower revolution type as compared with the map 1 shown in FIG. 5. The map 3 shown in FIG. 7 has target slip ratio characteristic lines such that an increase in engine speed is suppressed in relation to the depression of the accelerator pedal. FIG. 8 shows a map 4, which is of the same type as that of the map 3 and is dedicated to a high revolutional range. The map 4 has target slip ratio characteristic lines which are of a lower revolution type as compared with the map 3. The maps 1 to 4 are used for a level road and a downhill road.

Figure 9:
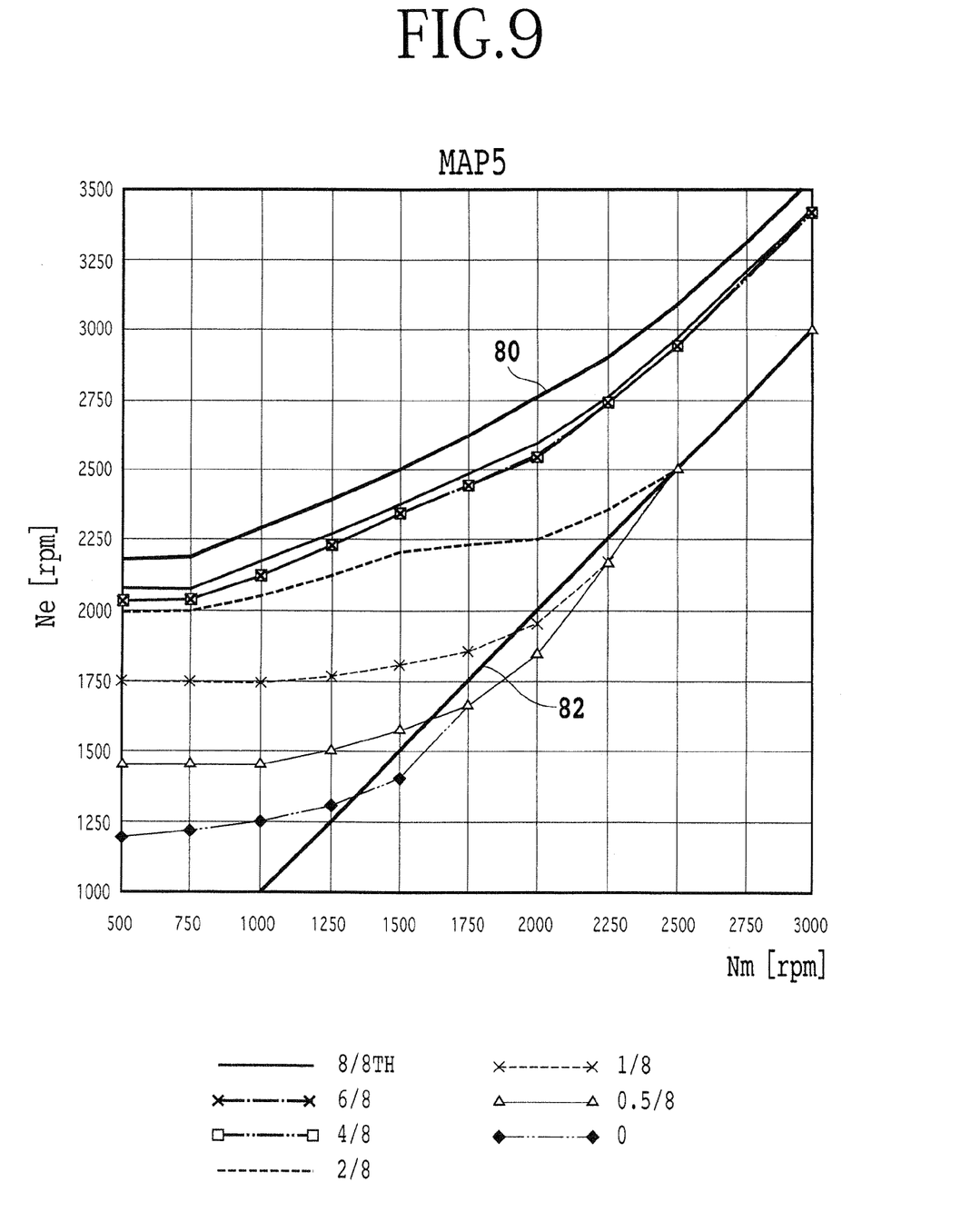
FIG. 9 is a map 5 such that even though the lock-up clutch is subjected to continuous slip control, the heating load on the lock-up clutch becomes a value causing no problem in durability.
Figure 10:
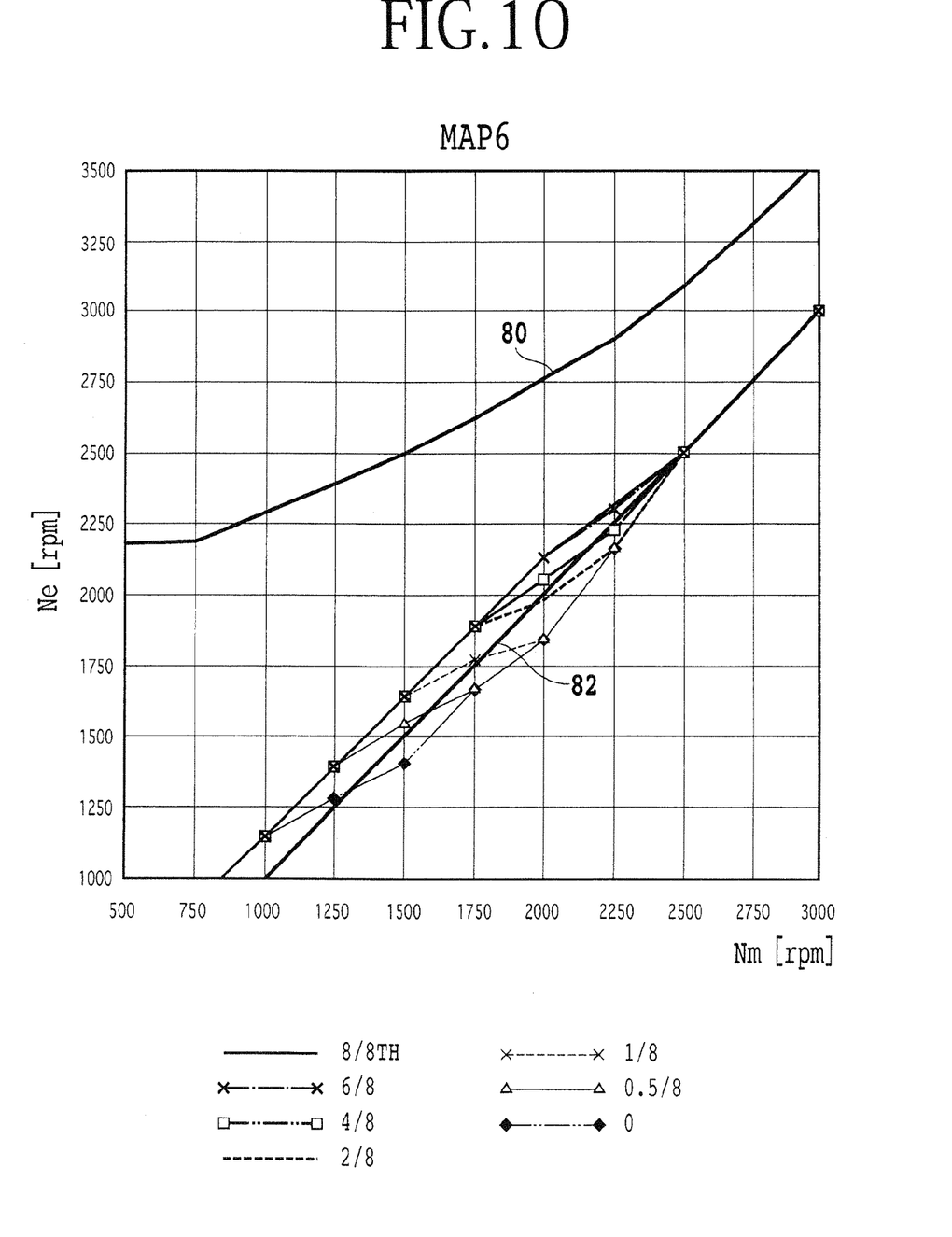
FIG. 10 is a map 6, which is of the same type as that of the map 5 and is dedicated to a high revolutional range, in which the slip of the lock-up clutch is reduced as contrary to the map 5.

FIG. 9 shows a map 5 for use in running on an uphill road. The map 5 shown in FIG. 9 has target slip ratio characteristic lines such that even though the lock-up clutch is subjected to continuous slip control, the heating load on the lock-up clutch becomes a value causing no problem in durability. FIG. 10 shows a map 6 for use in running on an uphill road, which map 6 is of the same type as that of the map 5 and is dedicated to a high revolutional range. The map 6 shown in FIG. 10 has target slip ratio characteristic lines such that the slip of the lock-up clutch is reduced as contrary to the map 5 shown in FIG. 9 to thereby reduce the heating load on the lock-up clutch.

Table 1 shows a changing method for the target slip ratio of the lock-up clutch during running in the condition where the accelerator pedal is on (depressed).

TABLE 1

| running environment | range | shift condition | | | LOW | 2ND | 3RD | 4TH | 5TH | 6TH |
|---|---|---|---|---|---|---|---|---|---|---|
| level road/downhill road | D range | — | | | | | ② | | ① | |
| | manual mode | Nm > 1750 TH < 2/8 or Nm > 2000 | low Nm ↕ high Nm | Nm < 1750 | | | ① | | ③ | |
| uphill road | D/ manual mode | Nm > 2000 TH < 1.5/8 or Nm > 2500 | low Nm ↕ high Nm | Nm < 1900 | | | | ④ ⑤ ⑥ | | |

As apparent from Table 1, the target slip ratio of the lock-up clutch is changed according to whether the running range is a D range or a manual mode range, according to whether the running environment (running road) is a level road/downhill road or an uphill road, and according to the gear position during running in the condition where the accelerator pedal is on (depressed). More specifically, during running on a level road or a downhill road in the D range, the map 1 is selected for the fourth to sixth gear positions, and the map 2 is selected for the first to third gear positions. During running on a level road or a downhill road in the manual mode range, different maps are selected according to the rotational speed Nm of the main shaft of the automatic transmission. More specifically, when the rotational speed Nm of the main shaft is decreased from a high speed condition to satisfy the condition of Nm<1700 rpm, the map 3 is selected for the third to sixth gear positions, and the map 1 is selected for the first and second gear positions.

Conversely, when the rotational speed Nm of the main shaft is increased from a low speed condition to satisfy the condition of TH (throttle angle)<2/8 and Nm>1750 rpm or the condition of Nm>2000 rpm, the map 4 is selected for the first to sixth gear positions. During running on an uphill road both in the D range and in the manual mode range, the same map is selected according to the main shaft speed Nm. More specifically, when the main shaft speed Nm is decreased from a high speed condition to satisfy the condition of Nm<1900 rpm, the map 5 is selected for the first to sixth gear positions. Conversely, when the main shaft speed Nm is increased from a low speed condition to satisfy the condition of TH<1.5/8 and Nm>2000 rpm or the condition of Nm>2500 rpm, the map 6 is selected for the first to sixth gear positions.

Referring to Table 2, there is shown a changing method for the target slip ratio of the lock-up clutch during running in the condition where the accelerator pedal is off (undepressed).

TABLE 2

| running environment | range | LOW | 2ND | 3RD | 4TH | 5TH | 6TH |
|---|---|---|---|---|---|---|---|
| level road/ | D range | OFF | | ② | | ① | ① |
| uphill road | manual mode | OFF | ② | | ① | ① | |
| downhill | D range | OFF | | | ① | | |
| road | manual mode | OFF | | ① | | | |

As apparent from Table 2, during running on a level road or an uphill road in the D range in the off condition of the accelerator pedal, the map 1 is selected for the fourth to sixth gear positions, the map 2 is selected for the third gear position, and the lock-up clutch is disengaged for the first and second gear positions. During running on a level road or an uphill road in the manual mode range in the off condition of the accelerator pedal, the map 1 is selected for the third to sixth gear positions, the map 2 is selected for the second gear position, and the lock-up clutch is disengaged for the first gear position. On the other hand, during running on a downhill road in the D range in the off condition of the accelerator pedal, the map 1 is selected for the second to sixth gear positions, and the lock-up clutch is disengaged for the first gear position. Also during running on a downhill road in the manual mode range in the off condition of the accelerator pedal, the map 1 is selected for the second to sixth gear positions, and the lock-up clutch is disengaged for the first gear position as in the D range.

Figure 11:
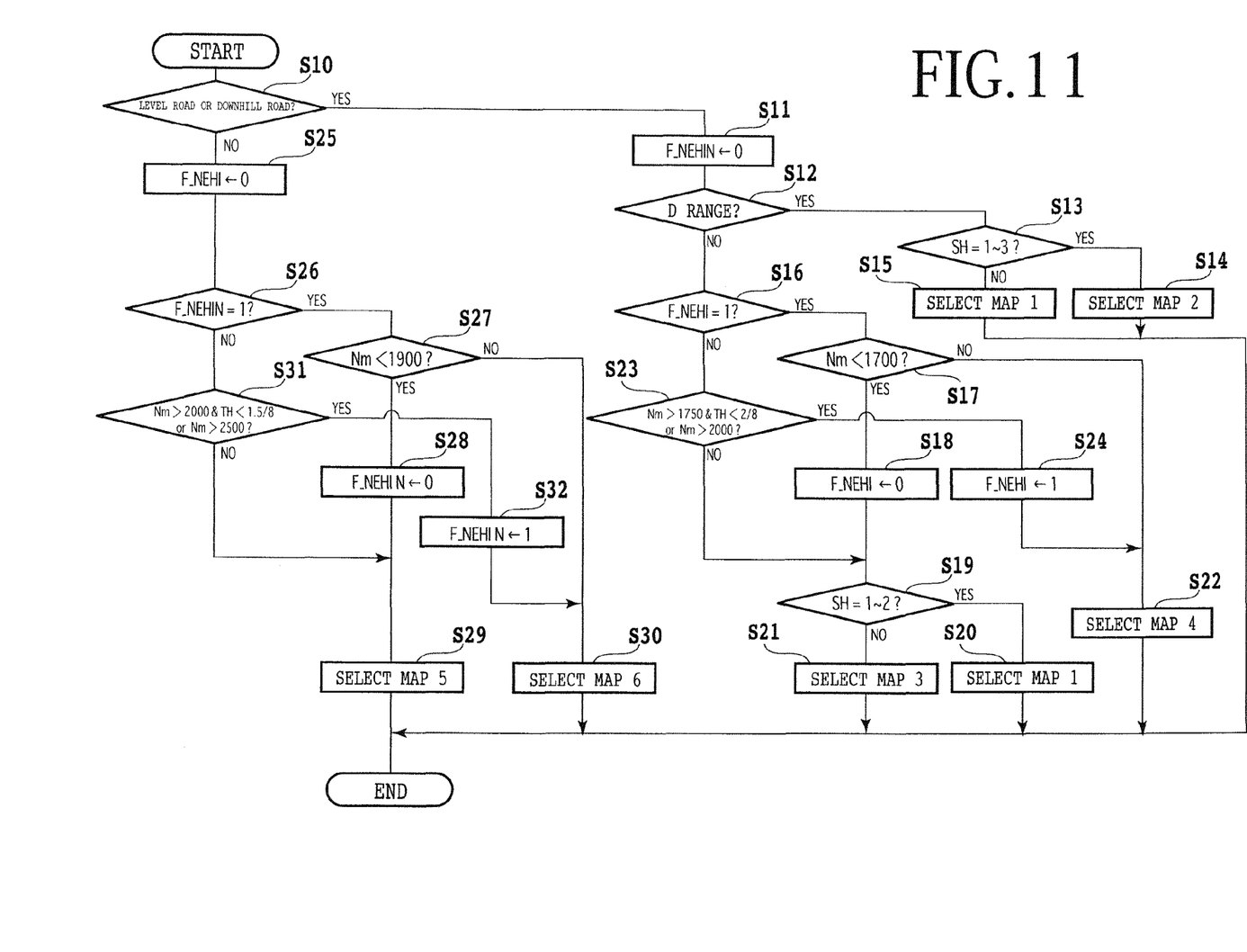
FIG. 11 is a flowchart showing the control sequence of the changing control for the target slip ratio of the lock-up clutch during running in the condition where an accelerator pedal is depressed.

The control sequence of the changing control for the target slip ratio of the lock-up clutch during running in the on condition of the accelerator pedal will now be described with reference to the flowchart shown in FIG. 11. In step S10, it is determined whether or not the running road is a level road or a downhill road. If the answer in step S10 is affirmative, i.e., if the running road is a level road or a downhill road, the program proceeds to step S11 to reset an uphill road switch decision flag F_NEHIN to 0. The program next proceeds to step S12 to determine whether or not the running range is the D range. If the answer in step S12 is affirmative, the program proceeds to step S13 to determine whether or not the gear position is any one of the first to third gear positions. If the answer in step S13 is affirmative, the program proceeds to step S14 to select the map 2, whereas if the answer in step S13 is negative, the program proceeds to step S15 to select the map 1.

If the answer in step S12 is negative, i.e., if the running range is not the D range, the program proceeds to step S16 to determine whether or not a level road manual mode switch decision flag F_NEHI is 1. If the answer in step S16 is affirmative, the program proceeds to step S17 to determine whether or not the main shaft speed Nm is less than 1700 rpm. If the answer in step S17 is affirmative, the program proceeds to step S18 to reset the level road manual mode switch decision flag F_NEHI to 0.

The program next proceeds to step S19 to determine whether or not the gear position is any one of the first and second gear positions. If the answer in step S19 is affirmative, the program proceeds to step S20 to select the map 1, whereas if the answer in step S19 is negative, the program proceeds to step S21 to select the map 3. If the answer in step S17 is negative, the program proceeds to step S22 to select the map 4. If the answer in step S16 is negative, the program proceeds to step S23 to determine whether or not the condition of Nm>1750 rpm and TH<2/8 or the condition of Nm>2000 rpm is satisfied. If the answer in step S23 is affirmative, the program proceeds to step S24 to set the level road manual mode switch decision flag F_NEHI to 1, and the program next proceeds to step S22 to select the map 4.

If the answer in step S23 is negative, the program proceeds to step S19 to determine whether or not the gear position is any one of the first and second gear positions. If the answer in step S19 is affirmative, the program proceeds to step S20 to select the map 1, whereas if the answer in step S19 is negative, the program proceeds to step S21 to select the map 3. On the other hand, if the answer in step S10 is negative, i.e., if the running road is neither a level road nor a downhill road. In other words, if the running road is an uphill road, the program proceeds to step S25 to reset the level road manual mode switch decision flag F_NEHI to 0. The program next proceeds to step S26 to determine whether or not the uphill road switch decision flag F_NEHIN is 1.

If the answer in step S26 is affirmative, the program proceeds to step S27 to determine whether or not the condition of Nm<1900 rpm is satisfied. If the answer in step S27 is affirmative, the program proceeds to step S28 to reset the uphill road switch decision flag F_NEHIN to 0, and the program next proceeds to step S29 to select the map 5. If the answer in step S27 is negative, the program proceeds to step S30 to select the map 6. On the other hand, if the answer in step S26 is negative, the program proceeds to step S31 to determine whether or not the condition of Nm>2000 rpm and TH<1.5/8 or the condition of Nm>2500 rpm is satisfied. If the answer in step S31 is affirmative, the program proceeds to step S32 to set the uphill road switch decision flag F_NEHIN to 1, and the program next proceeds to step S30 to select the map 6. If the answer in step S31 is negative, the program proceed to step S29 to select the map 5.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control device for an automatic transmission having a torque converter with a lock-up clutch provided between an engine and said automatic transmission, and a lock-up control device for controlling an engaged condition of said lock-up clutch, said control device comprising:

a plurality of different target slip ratio maps each having a plurality of target slip ratio characteristic lines of said lock-up clutch predetermined according to a throttle angle;

first map selecting means for selecting a first common target slip ratio map of said target slip ratio maps according to a running range and a gear position during running on a level road/downhill road in the condition where an accelerator pedal is depressed, and selecting one of said target slip ratio maps during running on an uphill road in the condition where an accelerator pedal is depressed, said first common target slip ratio map being common to the level road and downhill road; and second map selecting means for selecting a second common target slip ratio map of said target slip ratio maps according to a running range and the gear position during running on a level road/uphill road in the condition where an accelerator pedal is undepressed, and selecting one of said target slip ratio maps during running in the condition where said accelerator pedal is undepressed, said second common target slip ratio map being common to the level road and the uphill road, wherein a manual mode range for performing a shift operation instructed by a manual operation of a driver is settable, said first map selecting means selects said target slip ratio maps according to the gear position during running on the level road/downhill road and in the manual mode range in a case where the rotational speed of an input shaft in the automatic transmission is less than a first predetermined speed, and selects only one target slip ratio map in the manual mode range in a case where the rotational speed of the input shaft in the automatic transmission is greater than a second predetermined speed which is greater than said first predetermined speed;

said first map selecting means changes a target slip ratio map to select from said target slip ratio maps during running on the uphill road in a case where the rotational speed of the input shaft in the automatic transmission is less than a third predetermined speed and in a case where the rotational speed of the input shaft in the automatic transmission is greater than a fourth predetermined speed which is greater than the third predetermined speed, and said second map selecting means selects said target slip ratio maps during running on the level road/uphill road according to the gear position, and selects only one target slip ratio map of said target Slip ratio maps during running on the downhill road.

2. The control device for the automatic transmission according to claim 1, wherein the target slip ratio at a low gear position is set larger than that at a high gear position during running on a level road or an uphill road.

3. The control device for the automatic transmission according to claim 1, wherein when the rotational speed of an input shaft in said automatic transmission is less than the third predetermined speed during running on an uphill road in the condition where said accelerator pedal is depressed, said first selecting means sets a first target slip ratio irrespective of the gear position, whereas when the rotational speed of said input shaft is greater than or equal to said fourth predetermined speed which is greater than said third predetermined speed in the condition where said accelerator pedal is depressed, said first selecting means sets a second target slip ratio which is less than said first target slip ratio irrespective of a gear position.

* * * * *